Nov. 19, 1929.  W. E. SEASTEDT  1,735,881
SHAFT BEARING
Filed Aug. 8, 1928
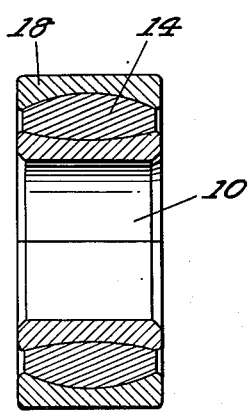
Fig. 1
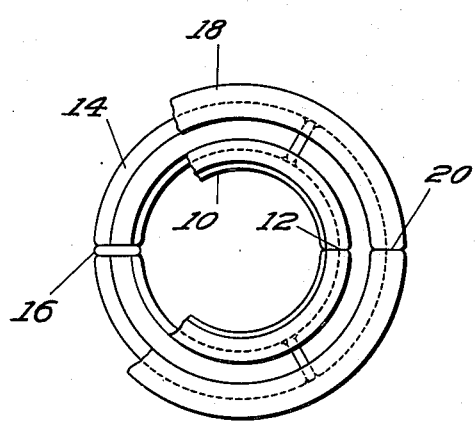
Fig. 2
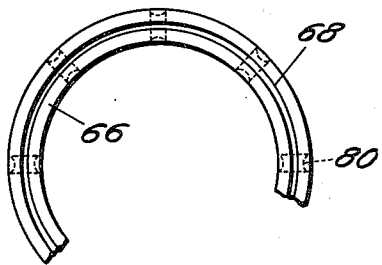
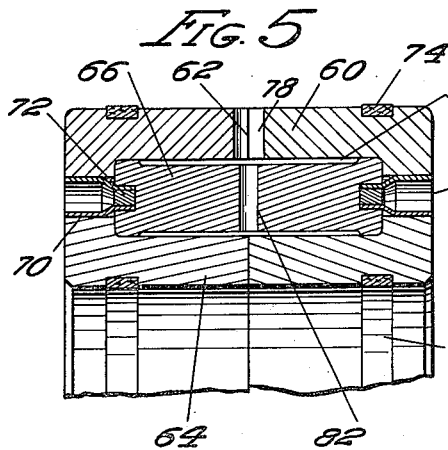
Fig. 5
Fig. 4
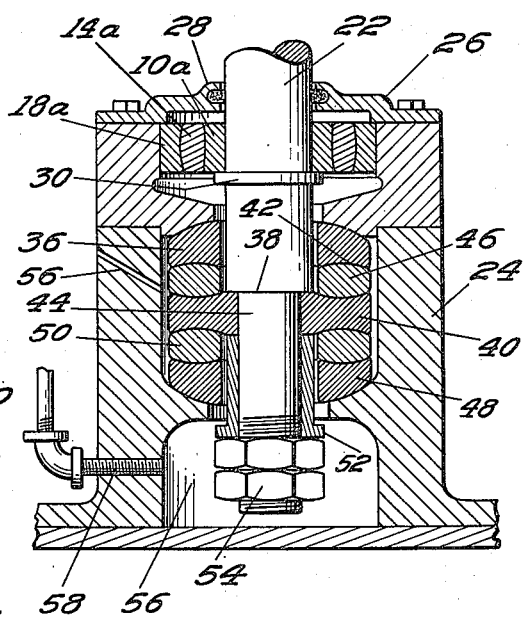
Fig. 3
WILLIAM E. SEASTEDT
INVENTOR
PER
Albert J. Fihe
ATTORNEY Patented Nov. 19, 1929

1,735,881

UNITED STATES PATENT OFFICE

WILLIAM E. SEASTEDT, OF CHICAGO, ILLINOIS

SHAFT BEARING

Application filed August 8, 1928. Serial No. 298,262.

This invention relates to improvements in shaft bearings and has for one of its principal objects the provision of means for efficiently journaling a horizontal or vertical drive shaft.

One of the important objects of this invention is to provide a shaft bearing which is self aligning and one which may be quickly and conveniently mounted upon and readily detached from a drive shaft.

Another important object of this invention is the provision of a simply constructed combination radial and double thrust bearing, a combination bearing which is efficient in its operation and which can be economically constructed and marketed.

A further important object of the invention is to provide a bearing which can be used for marine purposes, pumps and in short in any situation in which leakage prevention is an important factor.

Other and further important objects of the invention will be apparent from the disclosures in the accompanying drawings and following specification.

The invention, in a preferred form, is illustrated in the drawings and hereinafter more fully described.

In the drawings:

Figure 1 is a profile sectional view of a self aligning ring bearing.

Figure 2 is a vertical elevation of the bearing shown in Figure 1, parts being broken away.

Figure 3 is a vertical sectional view of a combination radial and double thrust bearing.

Figure 4 is an enlarged horizontal sectional view of a portion of a modified form of the shaft bearing.

Figure 5 is a fragmentary elevation of the ring portion of the bearing shown in Figure 4.

As shown in the drawings:

The reference numeral 10 indicates generally the inner race of a shaft bearing which is adapted to be rigidly mounted upon a drive shaft and turn therewith. The member 10 is preferably of split construction, as shown best at 12 in Figure 2, or if desired can be made and readily mounted upon the shaft in one piece.

The outer peripheral face of the race 10 is concave and slidably mounted upon the circumference thereof is a sectional ring 14. The ring 14 is preferably constructed in a plurality of arcuate sections, the adjacent ends of the same being separated by plates or spacers 16. The inner peripheral faces of the sectional ring 14 and spacers 16 are convex and are adapted to conform with the concave contour of the outer face of the inner race 10.

An outer race 18 is slidably mounted upon the outer face of the ring 14 and is adapted to be rigid with respect to a bearing housing or a machine in which the bearing may be positioned. The member 18 is preferably of split construction as shown at 20 of Figure 2, but because of the arcuate character of the sliding surfaces of members 18 and 14 respectively, the race 18 can also be constructed solid, as the geometrical center of the bearing is also the center of curvature of the sliding surfaces.

Referring particularly to Figure 3, the reference numeral 22 indicates generally a vertical shaft upon which axial, upward and downward thrusts are exerted. The shaft 22 is rotatably mounted in a bearing housing 24. A cover plate 26, preferably made in sections, forms a closure for the upper end of the housing 24 and is provided with a central opening through which the shaft 22 is adapted to be positioned. A stuffing box or the like 28 surrounds the shaft 22 and comprises the edge of the central opening in the plate 26. A flange 30 is integrally affixed to the shaft 22 and is adapted to retain the inner race $10^a$ of a bearing similar to the bearing shown in Figure 1. The outer race $18^a$ is rigidly attached to the wall of the housing 24 and the sectional ring $14^a$ slides freely between the two members $10^a$ and $18^a$, thereby providing an efficient axial bearing for the shaft 22.

A race 36 is loosely mounted upon the shaft 22 and is free to rotate within the housing 24. A shoulder is formed upon the shaft as shown at 38 in Figure 3, the lower end of the shaft being of a smaller diameter than the shaft proper as shown at 44.

Rigidly mounted upon the shaft immediately below the shoulder 38 and adapted to turn therewith is a middle race 40. Both the upper race 36 and the middle race 40 are provided with concave sliding surfaces 42 and adapted to freely slide between these two surfaces is a sectional ring 46, substantially similar to the rings 14 and 14ª.

A lower race 48 is loosely mounted upon the shaft 22 and freely rotates within the housing 24. Another sectional ring 50 identical with the ring 46 is positioned between the surfaces of the middle race 40 and the lower race 48. The middle race 40 is held in position on the shaft by means of a sleeve 52 which is in turn locked by means of the lock nuts 54. Oil inlets 56 are provided in the walls of the housing 24, the waste oil seeping into an oil reservoir 56 from which it may be drawn by means of a pipe 58 and reused.

Referring particularly to Figures 4 and 5, a modification of the bearing is shown, this adaptation being suitable for use on motor boats, pumps and the like where the prevention of leakage past the bearing is an important factor.

The reference numeral 60 indicates generally a radial sectional view of an outer race. This race is preferably constructed in two parts as shown at 62. An inner race 64 is also provided, and adapted to be slidably positioned between the two races is a sectional ring bearing 66. Each edge of the member 66 is provided with a groove 68, best shown in Figure 5, and rigidly positioned therein are two thin metal rings 70 which extend outwardly therefrom. Another metallic ring 72 serves to retain the rings 70 within the groove 68.

The member 64 is adapted to be rigidly mounted upon the shaft to be journaled and turns therewith, while the member 60 remains stationary being rigidly attached to the shaft housing. To insure liquid tight connections between the outer race and the housing and between the inner race and the shaft, a plurality of cork rings or the like 74 and 76 respectively are provided in the outer and inner faces of the respective members 60 and 64.

For lubricating purposes a plurality of oil holes 78 is provided in the outer race 60 and in order to circulate the oil properly upon all the sliding surfaces a plurality of axial grooves 80 are spaced at intervals upon the periphery of the ring 66. A plurality of radial connecting oil holes 82 are provided in the ring 66 to transmit the oil acquired through the hole 78 to the inner sliding surface of the ring 66.

It can be readily seen that a liquid tight bearing is thus provided inasmuch as no water, oil or the like can pass the members 70 between the outer and inner races, for the rings 70 being constructed of some suitable resilient metal will always provide an intimately close sliding contact with the respective portions of the outer and inner race.

It is apparent that herein is provided a bearing which has very desirable mechanical features, a bearing which can be economically manufactured and the efficient characteristics already displayed thereby assure a ready market for the same.

I am aware that many changes may be made and numerous details of construction varied throughout a wide range without departing from the principles of this invention, and I therefore do not purpose limiting the patent granted hereon otherwise than as necessitated by the prior art.

I claim as my invention:

In a double thrust bearing, a housing, a shaft within the housing, an upper race loosely mounted upon the shaft and freely rotatable within the housing, a middle race rigidly mounted upon the shaft, a lower race loosely mounted upon the shaft and freely rotatable within the housing and a ring comprising a plurality of sections slidably positioned between the upper race and the middle race and between the middle race and the lower race, the said three races having concave sliding surfaces, the said rings having convex upper and lower surfaces to conform with the concave faces of the races.

In testimony whereof I affix my signature.

WILLIAM E. SEASTEDT.